United States Patent
Wang

(10) Patent No.: US 8,873,003 B2
(45) Date of Patent: Oct. 28, 2014

(54) LIQUID CRYSTAL DISPLAY DEVICE AND MANUFACTURE METHOD THEREOF

(75) Inventor: Jun Wang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 180 days.

(21) Appl. No.: 13/381,083

(22) PCT Filed: Dec. 23, 2011

(86) PCT No.: PCT/CN2011/084585
§ 371 (c)(1),
(2), (4) Date: Dec. 27, 2011

(87) PCT Pub. No.: WO2013/091250
PCT Pub. Date: Jun. 27, 2013

(65) Prior Publication Data
US 2013/0155354 A1    Jun. 20, 2013

(30) Foreign Application Priority Data
Dec. 19, 2011  (CN) .......................... 2011 1 0427153

(51) Int. Cl.
*G02F 1/1333* (2006.01)
*G02F 1/13* (2006.01)

(52) U.S. Cl.
USPC .............................. 349/111; 349/110; 349/187

(58) Field of Classification Search
CPC .................................................. G02F 1/133512
USPC .................................................. 349/110–111
See application file for complete search history.

(56) References Cited

U.S. PATENT DOCUMENTS

| | | | |
|---|---|---|---|
| 6,407,783 B1 * | 6/2002 | Ohgawara et al. | 349/110 |
| 6,429,916 B1 * | 8/2002 | Nakata et al. | 349/106 |
| 6,917,402 B2 * | 7/2005 | Hosoda et al. | 349/111 |
| 7,330,228 B2 * | 2/2008 | Kiguchi et al. | 349/106 |
| 2010/0171393 A1 * | 7/2010 | Pei et al. | 310/330 |

* cited by examiner

*Primary Examiner* — Nathanael R Briggs

(57) ABSTRACT

The present invention provides a liquid crystal display device, including an array substrate, a color film substrate and a liquid crystal layer. The color film substrate includes a black matrix and the black matrix is formed by a black electrical conductive adhesive. The present invention also provides a manufacture method of a liquid crystal display device. The present invention adopts the liquid crystal display device and the manufacture method thereof to efficiently eliminate the static electricity and reduce the manufacture cost thereby solving the technical problems of the prior liquid crystal display device having a high cost and being not capable of efficiently eliminating the static electricity.

12 Claims, 4 Drawing Sheets

LIQUID CRYSTAL DISPLAY DEVICE AND MANUFACTURE METHOD THEREOF

BACKGROUND OF THE INVENTION

1. Field of the Invention

The present invention relates to a liquid crystal display field, and more particularly to a liquid crystal display device and a manufacture method thereof being capable of eliminating the static electricity and having a low cost.

2. Description of the Prior Art

In a flat panel display device, a TFT-LCD (Thin Film Transistor Liquid Crystal Display) has characteristics of small volume, low power, relative low manufacture cost, no-radiation and so on, and occupies a dominant position in the market of the present flat panel display device. Generally, the TFT-LCD is formed by combining an array substrate (a TFT substrate) and a color film substrate (a color filter substrate). During the course of manufacturing a red, green and blue color layer of the color film substrate, it ordinarily needs to manufacture a BM (Black Matrix) for preventing the light leakage of the red, green and blue layer.

In the prior art, an organic material is generally used as a material of the BM, but if the organic material is manufactured to be the BM, the BM can not efficiently eliminate the static electricity on the red, green and blue layer. Moreover, in the prior art, the flow of processing the BM is complex, and a coating equipment, an exposure machine, a developing equipment and so on applied in this process belong to expensive devices. Not only the cost of purchase is relatively high, but also it needs to regularly maintain these devices, so that resulting in the increasing of the manufacture cost of the liquid crystal display device.

Hence, it is necessary to provide a liquid crystal display device and a manufacture method for solving the problems existing in the prior art.

BRIEF SUMMARY OF THE INVENTION

One object of the present invention is to provide a liquid crystal display device and a manufacture method thereof being capable of eliminating the static electricity and having a low cost for solving the technical problems of the liquid crystal display device having a high cost and being not capable of efficiently eliminating the static electricity in the prior art.

For solving above problems, the technical solution provided by the present invention is as follows:

The present invention provides a liquid crystal display device, comprising an array substrate, a color film substrate, and a liquid crystal layer disposed between the array substrate and the color film substrate. The color film substrate includes a black matrix, wherein the black matrix is formed by a black electrical conductive adhesive.

In the liquid crystal display device of the present invention, the black electrical conductive adhesive includes an ultraviolet curing resin and doped grapheme particles. The volume ratio of the doped grapheme particles in the black electrical conductive adhesive is in the range of 20 to 85%.

In the liquid crystal display device of the present invention, the particle diameter of the doped grapheme particles is in the range of 30 to 200 nm.

The present invention also provides a manufacture method of a liquid crystal display device, comprising the steps of: A. coating a black electrical conductive adhesive onto a color film substrate, a shape of the coated black electrical conductive adhesive being corresponding to a predetermined shape of a black matrix; and B. curing the black electrical conductive adhesive to form the black matrix. The step A includes the steps of: A1. adhering a mask plate on the color film substrate, a pattern of the mask plate being the predetermined shape of the black matrix; A2. coating the black electrical conductive adhesive onto the mask plate; and A3. pre-curing the black electrical conductive adhesive and then removing the mask plate. The step B in particular includes: B1. using a light having a wavelength of 100 to 400 nm to irradiate the black electrical conductive adhesive for 30 to 540 seconds; and B2. baking the black electrical conductive adhesive for 300 to 1200 seconds under the temperature of 50 to 200° C.

The present invention also provides a manufacture method of a liquid crystal display device, comprising the steps of: A. coating a black electrical conductive adhesive onto a color film substrate, a shape of the coated black electrical conductive adhesive being corresponding to a predetermined shape of a black matrix; and B. curing the black electrical conductive adhesive.

In the manufacture method of the liquid crystal display device of the present invention, the step A includes the steps of: A1. adhering a mask plate on the color film substrate, a pattern of the mask plate being the predetermined shape of the black matrix; A2. coating the black electrical conductive adhesive onto the mask plate; and A3. pre-curing the black electrical conductive adhesive and then removing the mask plate.

In the manufacture method of the liquid crystal display device of the present invention, the step A3 in particular is pre-curing the black electrical conductive adhesive by ultraviolet irradiation or baking, and then removing the mask plate.

In the manufacture method of the liquid crystal display device of the present invention, the pre-curing treatment by ultraviolet irradiation is employing a light having a wavelength of 100 to 400 nm to irradiate the black electrical conductive adhesive for 30 to 540 seconds; and the pre-curing treatment by baking is baking the black electrical conductive adhesive for 30 to 900 seconds under the temperature of 50 to 100° C.

In the manufacture method of the liquid crystal display device of the present invention, the step A in particular is dripping the black electrical conductive adhesive onto a transfer printing cylinder, and coating the black electrical conductive adhesive onto the color film substrate by the transfer printing cylinder.

In the manufacture method of the liquid crystal display device of the present invention, the step B specifically includes: B1. using a light having a wavelength of 100 to 400 nm to irradiate the black electrical conductive adhesive for 30 to 540 seconds; and B2. baking the black electrical conductive adhesive for 300 to 1200 seconds under the temperature of 50 to 200° C.

In the manufacture method of the liquid crystal display device of the present invention, the step B1 is baking the black electrical conductive adhesive for 30 to 900 seconds under the temperature of 50 to 100° C., and the step B2 is baking the black electrical conductive adhesive for 300 to 1200 seconds under the temperature of 50 to 200° C.

In the manufacture method of the liquid crystal display device of the present invention, the black electrical conductive adhesive includes an ultraviolet curing resin and doped grapheme particles. The volume ratio of the doped grapheme particles in the black electrical conductive adhesive is in the range of 20 to 85%.

In the manufacture method of the liquid crystal display device of the present invention, the particle diameter of the doped grapheme particles is in the range of 30 to 200 nm.

The liquid crystal display device and the manufacture method thereof have the following beneficial effects: being capable of eliminating the static electricity and having a low manufacture cost, and solving the technical problems of the liquid crystal display device having a high cost and being not capable of efficiently eliminating the static electricity in the prior art.

For more clearly and easily understanding above content of the present invention, the following text will take a preferred embodiment of the present invention with reference to the accompanying drawings for detail description as follows.

DETAILED DESCRIPTION OF THE PREFERRED EMBODIMENTS

The following description of every embodiment with reference to the accompanying drawings is used to exemplify a specific embodiment, which may be carried out in the present invention.

The present invention provides a liquid crystal display device, comprising an array substrate, a color film substrate, and a liquid crystal layer disposed between the array substrate and the color film substrate. The color film substrate includes a black matrix. The liquid crystal display device of the present invention adopts a black electrical conductive adhesive to form the black matrix. Wherein the volume ratio of the doped grapheme particles in the black electrical conductive adhesive is in the range of 20 to 85%, the particle diameter of the doped grapheme particles is in the range of 30 to 200 nm, and the viscosity of the black electrical conductive adhesive is in the range of 5 to 800 mPa·s. In this embodiment, a red, green and blue color layer may be disposed on the array substrate and also may be disposed on the color film substrate.

Figure 1:
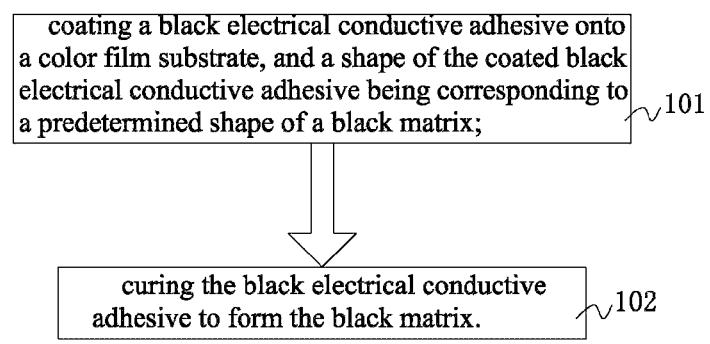
FIG. 1 is a flow chart of a preferred embodiment of a manufacture method of a liquid crystal display device of the present invention.
Figure 2A:
FIGS. 2A to 2C are schematic views of the manufacturing process of a first embodiment of the manufacture method of the liquid crystal display device of the present invention.
Figure 2B:
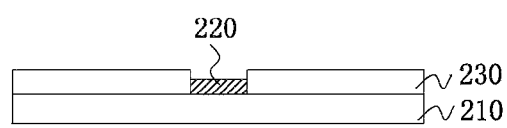
Figure 2C:
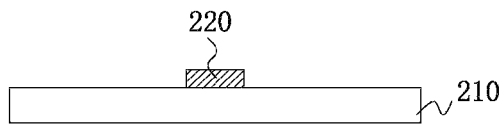

The following text will describe the above manufacturing process of the liquid crystal display device with reference to a flow chart of a preferred embodiment of a manufacture method of a liquid crystal display device of the present invention shown in FIG. 1 and the schematic views of the manufacturing process of a first embodiment of the manufacture method of the liquid crystal display device of the present invention shown in FIGS. 2A to 2C.

A step 101 is employing a mask plate 230 to coat a color film substrate 210 with a black electrical conductive adhesive 220, wherein a shape of the coated black electrical conductive adhesive 220 is corresponding to a predetermined shape of a black matrix; and a step 102 is curing the black electrical conductive adhesive 220 to form the black matrix.

Figure 3:
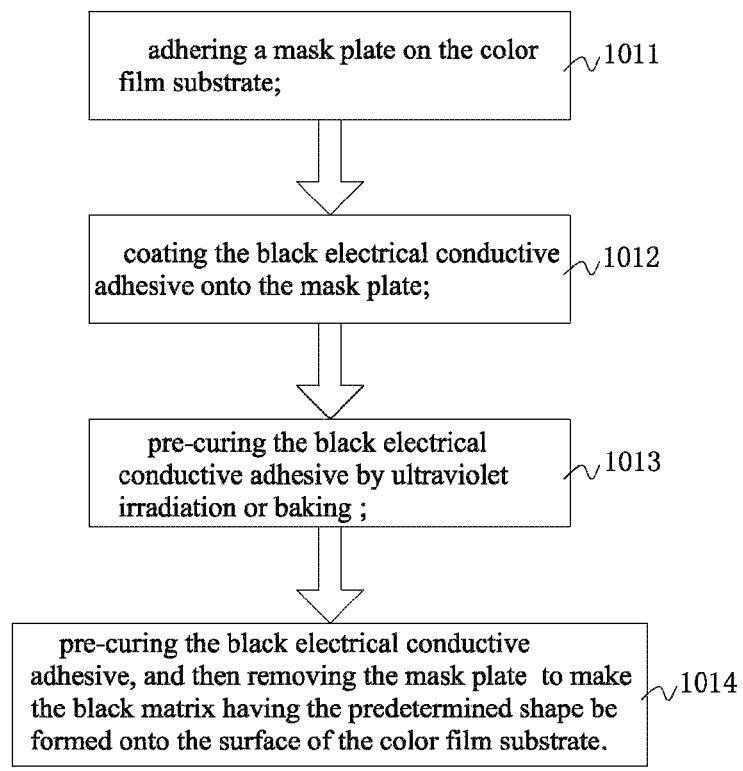
FIG. 3 is a flow chart of a step A of a first embodiment of the manufacture method of the liquid crystal display device of the present invention.

FIG. 3 is a flow chart of a step A of a first embodiment of the manufacture method of the liquid crystal display device of the present invention, wherein the step 101 is shown in FIG. 3 as follows:

a step 1011 is adhering the mask plate 230 on the color film substrate 210;

wherein a pattern of the mask plate 230 is the predetermined shape of the black matrix, shown as FIG. 2A;

a step 1012 is coating with the black electrical conductive adhesive 220 onto the mask plate 230;

as shown in FIG. 2B, the black electrical conductive adhesive 220 includes an ultraviolet curing resin and doped grapheme particles, the volume ratio of the doped grapheme particles in the black electrical conductive adhesive 220 is in the range of 20 to 85%, the particle diameter of the doped grapheme particles is in the range of 30 to 200 nm, and the viscosity of the black electrical conductive adhesive 220 is in the range of 5 to 800 mPa·s.

a step 1013 is pre-curing the black electrical conductive adhesive 220 by by ultraviolet irradiation or baking.

in concrete implementation, if performing the pre-curing treatment by ultraviolet irradiation, it needs to employ a light having a wavelength of 100 to 400 nm to irradiate the black electrical conductive adhesive 220 and the irradiation time is 30 to 540 seconds; and if performing the pre-curing treatment by baking, the black electrical conductive adhesive 220 needs to be baked for 30 to 900 seconds under the temperature of 50 to 100° C.; and a step 1014 is pre-curing the black electrical conductive adhesive 220 and then removing the mask plate 230 to make the black matrix having the predetermined shape be formed onto the surface of the color film substrate 210, as shown in FIG. 2C.

Because of performing the pre-curing treatment in the step 1013, the step 102 may be simplified, the specific step 102 in particular is as follows:

The color film substrate 210 with the pre-cured black electrical conductive adhesive 220 is placed in an annealer to perform the curing treatment (the heat treatment). The treatment temperature is 50 to 200° C. (this treatment temperature is higher than the pre-curing treatment temperature). The curing treatment time is 300 to 1200 seconds. The black matrix having the pattern can be finally obtained by the curing treatment.

In the embodiment, it is employing the mask plate 230 to coat the surface of the color film substrate 210 with the black electrical conductive adhesive 220 and make the black electrical conductive adhesive 220 form the pattern of the black matrix on the surface of the color film substrate 210. Because removing the mask plate 230 is possible to affect the pattern shape of the black electrical conductive adhesive 220, the pre-curing treatment of the black electrical conductive adhesive 220 before removing the mask plate 230 can assure the pattern shape of the black electrical conductive adhesive 220. The curing temperature is higher than the pre-curing temperature, so this can assure the quality of the black matrix formed by coating. The present invention adopts the black electrical conductive adhesive 220 to make the black matrix, so the present invention has a simple process and a low implement cost, and can efficiently reduce the cost of purchasing and maintaining the equipment. The black matrix also can be used to efficiently eliminate the static electricity produced in processing the substrate. The black electrical conductive adhesive may be an ultraviolet curing resin doped the electrical conductive particles such as the grapheme particles and so on, or a heat-curing adhesive material such as epoxy resin or other ultraviolet curing adhesive material. For the black electrical conductive adhesives 220 of different materials, the temperatures and the time of the pre-curing and curing treatment are a little different, so it needs to determine the actual curing temperature according to the black electrical conductive adhesives 220 of the different materials.

Figure 4:
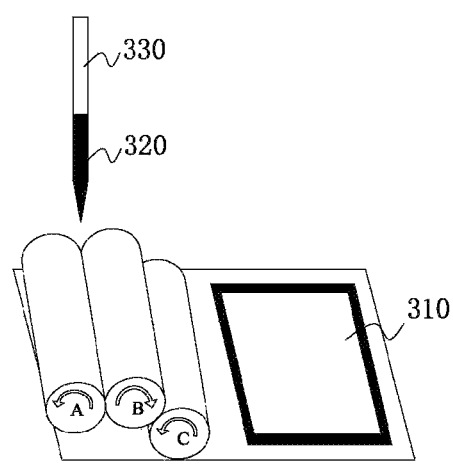
FIG. 4 is a manufacture schematic view of a second embodiment of the manufacture method of the liquid crystal display device of the present invention.

The following text will describe the above manufacturing process of the liquid crystal display device with reference to the flow chart of the preferred embodiment of the manufacture method of the liquid crystal display device of the present invention shown in FIG. 1 and a manufacture schematic view of a second embodiment of the manufacture method of the liquid crystal display device of the present invention shown in FIG. 4.

The step 101 is coating a black electrical conductive adhesive 220 onto a color film substrate 310 by the transfer printing mode, wherein a shape of the coated black electrical conductive adhesive 220 is corresponding to a predetermined shape of a black matrix; and a step 102 is curing the black electrical conductive adhesive 320 to form the black matrix.

Figure 5:
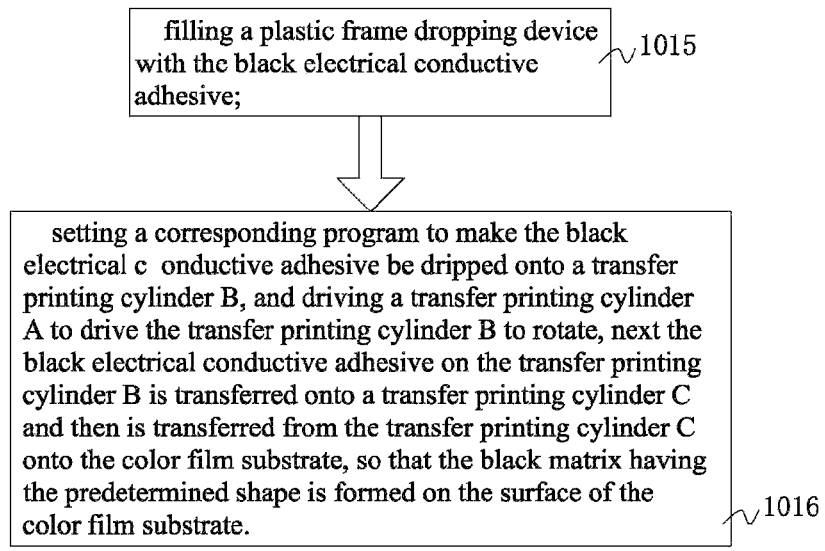
FIG. 5 is a flow chart of a step A of a second embodiment of the manufacture method of the liquid crystal display device of the present invention.

FIG. 5 is a flow chart of a step A of a second embodiment of the manufacture method of the liquid crystal display device of the present invention, wherein the step 101 is shown in FIG. 5 as follows:

a step 1015 is filling a plastic frame dropping device 330 with the black electrical conductive adhesive 320;

wherein, the volume ratio of the doped grapheme particles in the black electrical conductive adhesive is in the range of 20 to 85%, the particle diameter of the doped grapheme particles is in the range of 30 to 200 nm, and the viscosity of the black electrical conductive adhesive is in the range of 5 to 800 mPa·s; and a step 1016 is setting a corresponding program to make the black electrical conductive adhesive 320 be dripped onto a transfer printing cylinder B, and driving a transfer printing cylinder A to drive the transfer printing cylinder B to rotate, next the black electrical conductive adhesive 320 on the transfer printing cylinder B is transferred onto a transfer printing cylinder C and then is transferred from the transfer printing cylinder C onto the color film substrate 310, so that the black matrix having the predetermined shape is formed on the surface of the color film substrate 310.

The specific step 102 in particular is as follows:

a step 1021 is employing a light having a wavelength of 100 to 400 nm to irradiate the color film substrate 310 after the transfer printing treatment for curing the black electrical conductive adhesive 320 on the color film substrate 310, and the irradiation time is 30 to 540 seconds; and a step 1022 is placing the color film substrate 310 of being irradiated into an annealer to make the black electrical conductive adhesive 320 be further cured, wherein the treatment temperature is 50 to 200° C.; baking the black electrical conductive adhesive 320, wherein the baking time is 300 to 1200 seconds; and finally obtaining the black matrix having the pattern after the curing treatment.

Of course, the step 102 also may be realized by twice baking processes, wherein the step 102 in particular is as follows:

a step 1021 is placing the color film substrate 310 after the transfer printing treatment into the annealer to make the black electrical conductive adhesive 320 be cured, wherein the treatment temperature is 50 to 100° C., and baking the black electrical conductive adhesive 320, wherein the baking time is 30 to 900 seconds; and a step 1022 is further curing the black electrical conductive adhesive 320 after cured in the annealer, wherein the treatment temperature is 50 to 200° C. (this treatment temperature being higher than that of the first baking), and baking the black electrical conductive adhesive 320, wherein the baking time is 300 to 1200 seconds, and finally obtaining the black matrix having the pattern after the curing treatment.

In the embodiment, the black electrical conductive adhesive 320 is coated on the surface of the color film substrate 310 by the transfer printing mode, so that the black electrical conductive adhesive 320 forms the pattern of the black matrix on the surface of the color film substrate 310. When curing, it adopts twice curing processes, and the second curing temperature is higher than the first curing temperature. This can assure the quality of the black matrix formed by coating. The present invention adopts the black electrical conductive adhesive 220 to make the black matrix, so the present invention has a simple process and a low implement cost, and can efficiently reduce the cost of purchasing and maintaining the equipment. The black matrix also can be used to efficiently eliminate the static electricity produced in processing the substrate. The black electrical conductive adhesive may be an ultraviolet curing resin doped the electrical conductive particles such as the grapheme particles and so on, or a heat-curing adhesive material such as epoxy resin or other ultraviolet curing adhesive material. For the black electrical conductive adhesives 220 of different materials, the temperatures and the time of the pre-curing and curing treatment are a little different, so it needs to determine the actual curing temperature according to the black electrical conductive adhesives 220 of the different materials.

In conclusion, although the present invention has been disclosed by above preferred embodiments, above preferred embodiments are not used to limit the present invention. One of ordinary skills in the art also can make all sorts of improvements and amendments within the principles of the present invention. Therefore, the protection scope of the present invention should be based on the scope defined by the appended claims.

What is claimed is:

1. A manufacture method of a liquid crystal display device, comprising the steps of:
   A. coating a black electrical conductive adhesive onto a color film substrate, and a shape of the coated black electrical conductive adhesive being corresponding to a predetermined shape of a black matrix; and
   B. curing the black electrical conductive adhesive to form the black matrix;
   the step A comprising the steps of:
   A1. adhering a mask plate on the color film substrate, and a pattern of the mask plate being the predetermined shape of the black matrix;
   A2. coating the black electrical conductive adhesive onto the mask plate; and
   A3. pre-curing the black electrical conductive adhesive and then removing the mask plate;
   the step B specifically comprising the steps of:
   B1. using a light having a wavelength of 100 to 400 nm to irradiate the black electrical conductive adhesive for 30 to 540 seconds; and
   B2. baking the black electrical conductive adhesive for 300 to 1200 seconds under the temperature of 50 to 200° C.;
   wherein the black electrical conductive adhesive includes an ultraviolet curing resin and doped grapheme particles, and the volume ratio of the doped grapheme particles in the black electrical conductive adhesive being in the range of 20 to 85%.

2. The manufacture method of the liquid crystal display device as claimed in claim 1, wherein the step A3 in particular is:
   pre-curing the black electrical conductive adhesive by ultraviolet irradiation or baking, and then removing the mask plate.

3. The manufacture method of the liquid crystal display device as claimed in claim 2, wherein the pre-curing treatment by ultraviolet irradiation is: employing a light having a wavelength of 100 to 400 nm to irradiate the black electrical conductive adhesive for 30 to 540 seconds; and
   the pre-curing treatment by baking is: baking the black electrical conductive adhesive for 30 to 900 seconds under the temperature of 50 to 100° C.

4. The manufacture method of the liquid crystal display device as claimed in claim 1, wherein the particle diameter of the doped grapheme particles is in the range of 30 to 200 nm.

5. A manufacture method of a liquid crystal display device, comprising the steps of:
   A. coating a black electrical conductive adhesive onto a color film substrate, and a shape of the coated black electrical conductive adhesive being corresponding to a predetermined shape of a black matrix; and
   B. curing the black electrical conductive adhesive to form the black matrix;
   wherein the black electrical conductive adhesive includes an ultraviolet curing resin and doped grapheme particles, and the volume ratio of the doped grapheme particles in the black electrical conductive adhesive being in the range of 20 to 85%.

6. The manufacture method of the liquid crystal display device as claimed in claim 5, wherein the step A comprising the steps of:
   A1. adhering a mask plate on the color film substrate, and a pattern of the mask plate being the predetermined shape of the black matrix;
   A2. coating the black electrical conductive adhesive onto the mask plate; and
   A3. pre-curing the black electrical conductive adhesive and then removing the mask plate.

7. The manufacture method of the liquid crystal display device as claimed in claim 6, wherein the step A3 in particular is:
   pre-curing the black electrical conductive adhesive by ultraviolet irradiation or baking, and then removing the mask plate.

8. The manufacture method of the liquid crystal display device as claimed in claim 7, wherein
   the pre-curing treatment by ultraviolet irradiation is: employing a light having a wavelength of 100 to 400 nm to irradiate the black electrical conductive adhesive for 30 to 540 seconds; and
   the pre-curing treatment by baking is: baking the black electrical conductive adhesive for 30 to 900 seconds under the temperature of 50 to 100° C.

9. The manufacture method of the liquid crystal display device as claimed in claim 5, wherein the step A in particular is:
   dripping the black electrical conductive adhesive onto a transfer printing cylinder, and coating the black electrical conductive adhesive onto the color film substrate by the transfer printing cylinder.

10. The manufacture method of the liquid crystal display device as claimed in claim 5, wherein the step B in particular is:
    B1. using a light having a wavelength of 100 to 400 nm to irradiate the black electrical conductive adhesive for 30 to 540 seconds; and
    B2. baking the black electrical conductive adhesive for 300 to 1200 seconds under the temperature of 50 to 200° C.

11. The manufacture method of the liquid crystal display device as claimed in claim 5 wherein the step B in particular is:
    B1. under the temperature of 50 to 100° C., baking the black electrical conductive adhesive for 30 to 900 seconds; and
    B2. under the temperature of 50 to 200° C., baking the black electrical conductive adhesive for 300 to 1200 seconds.

12. The manufacture method of the liquid crystal display device as claimed in claim 5, wherein the particle diameter of the doped grapheme particles is in the range of 30 to 200nm.

* * * * *